Nov. 1, 1966   E. L. FEATHERINGHAM   3,281,907
RESILIENT LOCKING FASTENERS

Filed Nov. 2, 1962   3 Sheets-Sheet 1

Earl L. Featheringham
INVENTOR.

BY *Clarence A. O'Brien*
and *Harvey B. Jacobson*
Attorneys

Nov. 1, 1966  E. L. FEATHERINGHAM  3,281,907
RESILIENT LOCKING FASTENERS
Filed Nov. 2, 1962
3 Sheets-Sheet 2

Earl L. Featheringham
INVENTOR.
BY
Attorneys

Nov. 1, 1966   E. L. FEATHERINGHAM   3,281,907
RESILIENT LOCKING FASTENERS
Filed Nov. 2, 1962
3 Sheets-Sheet 3
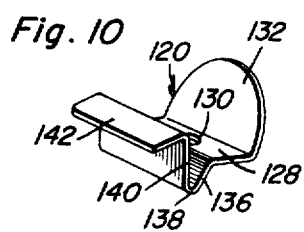
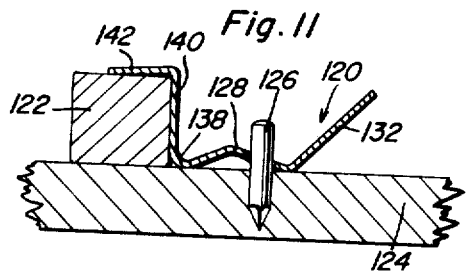
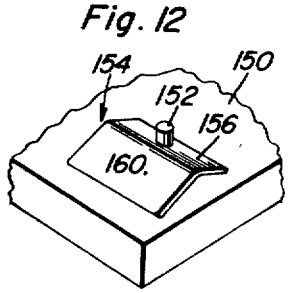
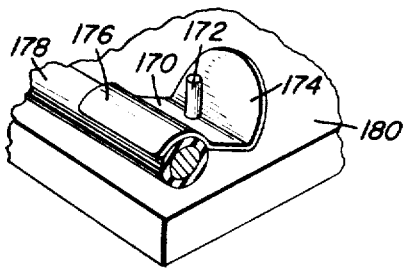
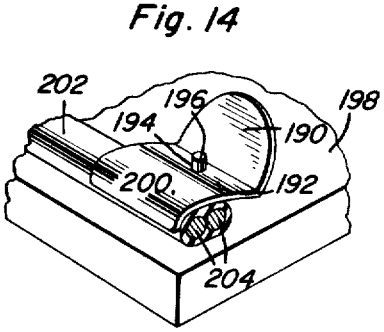
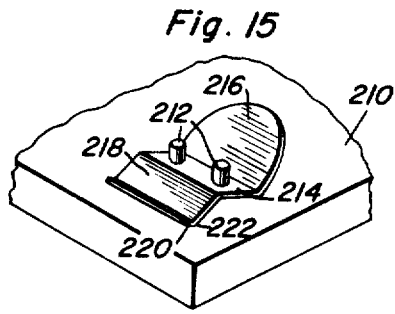
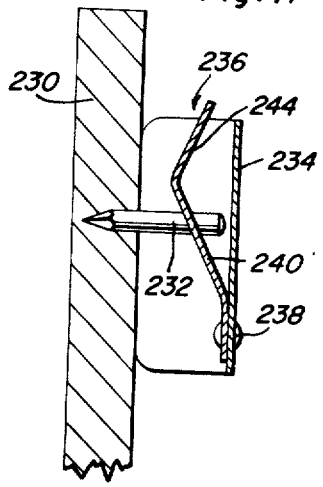
Earl L. Featheringham
INVENTOR.
BY *Clarence A. O'Brien*
and *Harvey B. Jacobson*
Attorneys

United States Patent Office 3,281,907
Patented Nov. 1, 1966

1

3,281,907
RESILIENT LOCKING FASTENERS
Earl L. Featheringham, 1505 Byron Ave. SW.,
Massillon, Ohio
Filed Nov. 2, 1962, Ser. No. 234,998
3 Claims. (Cl. 24—73)

This invention comprises novel and useful resilient locking fasteners and more particularly pertains to a light weight inexpensive sheet metal type of fastener having a resilient locking action and which may be quickly and easily applied to or released from an anchor pin as may be desired.

The principal object of this invention is to provide a simplified inexpensive light weight construction of fastener which shall be inherently resiliently biased to its fastening position and may be easily applied or released as may be desired.

A further object of the invention is to provide a resilient fastener construction in accordance with the preceding object which shall be capable of taking a great variety of configurations in order to adapt it specifically to different usages.

A further and more specific object of the invention is to provide a resilient fastener construction ideally adapted for imparting a resilient thrust for taking up end play of revolving members in various machines such as electric motors, machinery, power saws, grinders and the like and which will act as a thrust bearing to impart a desired tension for exerting end thrust to rotating and other members.

Still another specific object of the invention is to provide a fastener specifically and especially adapted for supporting pictures, mirrors and similar objects which are hung by wires in a secure and non-slipping manner, and which may be readily applied to or released from an anchor pin from their anchorage as desired.

A still further object of the invention is to provide a fastener in accordance with the preceding objects which is specifically adapted to encircle and securely anchor in place such members as wires, conduits and the like.

A further object of the invention is to provide a resilient fastener lock construction in accordance with the preceding objects which is specifically adapted for the securing of box-like or receptacle-like objects to a supporting surface and wherein the fastener may be concealed within the supported object.

A still further purpose of the invention is to provide a fastener specifically adapted to secure firmly in place objects which are of a length or height greater than that of the fastener and which will secure such objects despite the presence of vibration.

A further and very important object of the invention is to provide a resilient locking fastener in accordance with the preceding objects which shall consist of a single leaf spring member resiliently but releasably secured to a single anchorage member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a perspective view of a third preferred form of the invention and one which is specifically suitable for resiliently retaining in assembled relation such objects as electric conduits and the like;

FIGURE 10 is a fifth preferred form of the invention specifically adapted to the securing of relatively large objects and which may be subjected to vibration to a supporting surface;

FIGURE 11 is a view in vertical central longitudinal section taken upon an enlarged scale of the fastener of FIGURE 10 showing the latter in use;

FIGURE 12 is a perspective view of still another form of the invention in perhaps its simplest form;

FIGURE 13 is a detail perspective of still another form of the invention which is specifically adapted to secure a single cylindrical object to a flat supporting surface;

FIGURE 14 is a perspective view of yet another form of the invention adapted to perform somewhat the functions of the form of the invention shown in FIGURES 6 and 7;

FIGURE 15 is a modified construction resembling that of FIGURE 12 but mounted upon two anchor pins;

FIGURE 17 is a view in vertical central longitudinal section of still another form of the invention somewhat resembling that of FIGURE 9.

It will be noted that the same basic principles of construction and operation are embodied in all of the different varieties of fasteners illustrated in the accompanying drawings. Briefly, each resilient locking fastener consists of a single leaf spring element of inherent resiliency and which is flexed to engage upon a supporting or anchoring pin and by its resilience will both clamp and hold an article against a supporting surface and also resiliently lock itself to its anchoring support in a manner which is easily applied and yet readily releasable.

Figure 1:
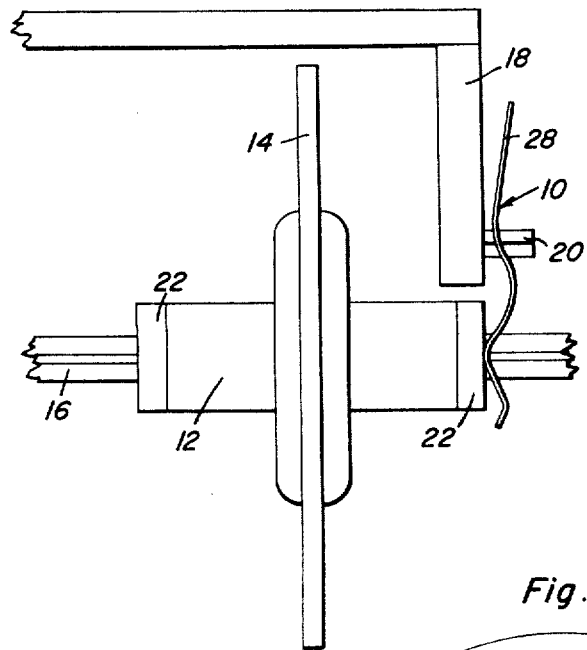
FIGURE 1 is a view in elevation of the preferred embodiment of the invention illustrating its use in maintaining a machine element such as a wheel in axially slidable adjustment upon a machine shaft.
Figure 2:
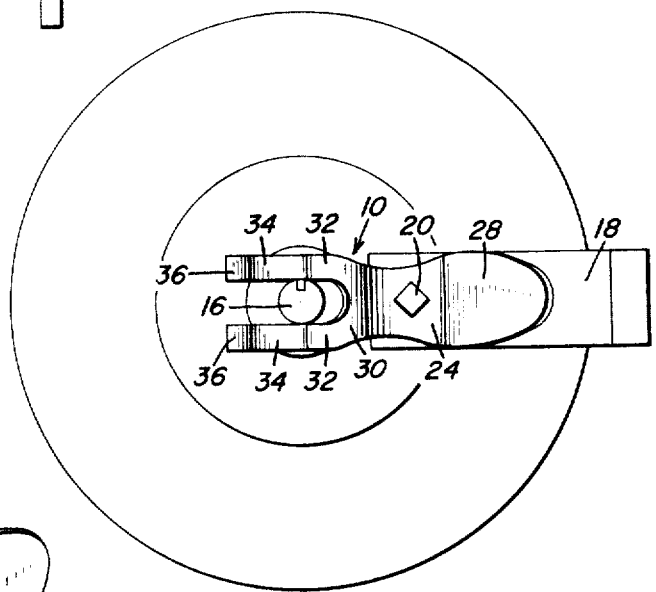
FIGURE 2 is an end elevational view of the arrangement of FIGURE 1 taken from the right end thereof.
Figure 3:
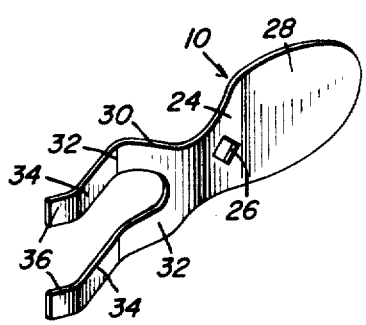
FIGURE 3 is a perspective view of the resilient fastener in accordance with this form of the invention.

Reference is now made first to the arrangement of FIGURES 1-3 which shows a preferred specialized type of fastener and its use.

The novel fastener of FIGURES 1-3, indicated generally by the numeral 10 is shown applied to a machine for yieldingly applying an end thrust to a hub-like member 12 carrying a disk-like cylindrical type of object such as a wheel or disk 14 upon a splined or keyed shaft 16. A supporting portion of a framework as at 18 is provided with a projecting anchor pin 20 by which the fastener 10 is releasably and resiliently supported to exert its biasing action against the member 12.

Shown at 22 are a pair of end thrust bearings carried by or abutting against the end of the hub 12 and by means of which end thrust may be applied thereto. Although but one of the fasteners 10, supports 18 and pins 20 are shown in FIGURE 1 it will be understood that it is preferred to provide a pair of such fasteners, one at each end, to each engage one of the thrust bearings and apply resilient thrust thereto.

Referring now to FIGURE 3 it will be observed that the fastener 10 consists of a single resilient leaf spring member having a central portion 24 provided with an aperture 26 therethrough for the reception of the anchor pin 20. This aperture may be square as shown in FIGURE 3 or may be of any other suitable shape if desired. From the midportion 24 there extends a relatively straight end portion 28 which provides a finger grip member, see FIGURE 1, and by which pressure may be applied to the fastener. The midportion 24 is bowed having a downwardly curving portion 30 from the extremities of which extend angulated fingers each shown at 32 which provide a bifurcation terminating in other angulated fingers 34 with downturned extremities as at 36. The bifurcations are provided so that the fingers 32, 34 and the extremities 36 may straddle the shaft 16 with the junction of the fingers 32 and 34 serving to abut against the thrust bearing 22 as shown best in FIGURE 1. In operation, the fastener is merely applied over the anchor pin 20 and pressed downwardly thereon by applying a pressure to the midportion 24 at its junction with the bifurcated portion 30 thus resiliently locking the fastener aperture 26 upon the anchor pin 20 thereby holding the fastener securely positioned and resiliently biasing the end thrust bearing 22. The same operaton is effected on the other side of the member 12 so that the latter will now be resiliently held securely in axially adjusted position upon the shaft 16. In order to reelase the fastener, it is merely necessary to press the finger portion 28 towards the right as viewed in FIGURE 1 thereby releasing the spring lock of the aperture 26 on the pin 20.

There is thus provided a fastening means which is readily or easily applied and released, and which enables various members keyed upon and driven by the shaft 16 to be axially adjusted thereon without the necessity for discontinuing the driving of the shaft or of the member 14 carried thereby. The extremities 36 may be used as fingergrips to cause the members 32, 34 to actuate the bearing 22 for shifting the members 12 and 14 and the shaft 16.

Although the application of this type of fastener has been illustrated with respect to only one form of apparatus, it will be readily appreciated that numerous similar usages are inherent in the construction.

Figure 4:
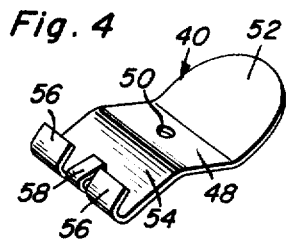
FIGURE 4 is a view in perspective of the second preferred embodiment of locking fastener in accordance with this invention and which fastener is particularly adapted for securing with a non-slipping engagement a wire, cord or the like in order to anchor or suspend pictures, plaques, mirrors and other similar articles.
Figure 5:
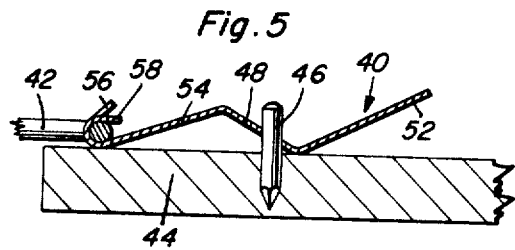
FIGURE 5 is a view in vertical central longitudinal section taken upon an enlarged scale through the fastener of FIGURE 4.

Referring next to the form of the invention shown in FIGURES 4 and 5 it will be observed that a fastener designated generally by the numeral 40 is illustrated as securing by means of a wire or cord loop or handle 42 some object to a support surface 44 provided with an anchor pin 46 projecting therefrom. This form of fastener likewise consists of a single unitary sheet metal resilient element and has a flat central body portion 48 with a central aperture 50 therethrough for the reception of the anchor pin 46. At one end of the body 48 there is provided an angulated finger grip portion as at 52 while the other side thereof is provided with an oppositely inclined flat portion 54 whose extremities are provided with backwardly turned hook members 56 at the opposite sides thereof and a central hook member 58 spaced therebetween.

It is believed that the operation of this form of the invention will be readily apparent. The fastener is secured against the supporting surface 44 by inserting the anchor pin 46 of the latter through the aperture 50 of the midportion 48 of the fastener. By pressing downwardly on either the finger grip portion 52 or the portion 48 to the left of the anchor pin as viewed in FIGURE 5, the fastener will be sufficiently flattened to cause the rim of its aperture to securely grip the anchor pin. The fastener may then be employed to receive the cord or wire 42 by which a picture, plaque, mirror or the like may be readily hung from a wall or other supporting surface.

The device can be readily released by simply grasping the finger member 52 and lifting it thereby releasing the wedging locking action of the apertured main portion 48 upon the anchor pin 46.

Figure 6:
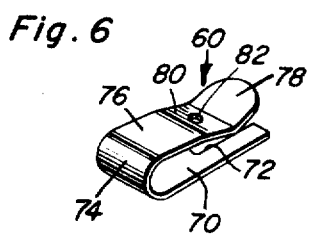
Figure 7:
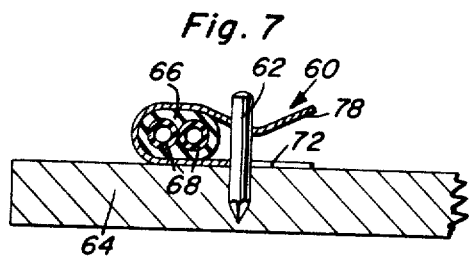
FIGURE 7 is an enlarged detail view in vertical central longitudinal section through the fastener of FIGURE 6.

Turning next to the embodiment of FIGURES 6 and 7 it will be observed that the fastener indicated therein generally by the numeral 60 is likewise employed to engage an anchor pin 62 carried by a supporting surface 64. This fastener is adapted to secure in position some object such as a braided electric cord or the like 66 having therein a pair of insulated electric conductors as at 68 with the embraced and attached article being laterally elongated. This form of the fastener is generally U-shaped, consisting of a flat base member 70 adapted to engage flush against the support surface 64, and having an apertured portion 72 at one extremity whose bifurcation is adapted to releasably embrace the anchor pin 62. A loop 74 secures this base portion 70 to a locking portion 76 having an angulated finger grip extremity 78 which joins the portion 76 by a relatively inclined surface 80 provided with a locking aperture 82 therein.

This form of the invention may be readily understood from an inspection of FIGURE 7, it being noted that depressing the finger grip portion 78 when the device is in the position shown in FIGURE 7 will resiliently lock the locking surface 80 to the anchor pin 62 and thereby frictionally clamp the article 66 in the loop formed between the portions 70 and 76. Upward pressure on the finger grip portion 78 will readily release the device.

Figure 8:
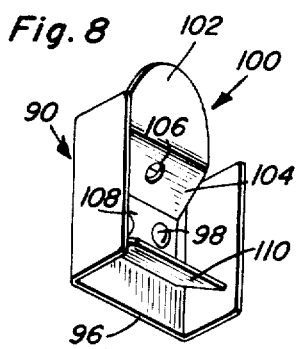
FIGURE 8 is a perspective view of a fourth preferred form of the invention adapted to be disposed within and mounted upon a cover or receptacle for anchoring it to a supporting surface.
Figure 9:
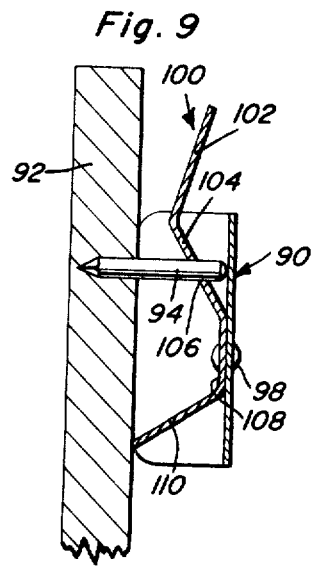
FIGURE 9 is a view in vertical central longitudinal section taken upon an enlarged scale through the fastener of FIGURE 8 and showing its application to a supporting surface.

Shown in FIGURES 8 and 9 is still another form of the invention indicated generally by the numeral 90. There is thus shown a supporting member 92 such as a wall or the like having a laterally projecting anchor pin 94 thereon. The fastener 90 consists of a shield, hood or generally U-shaped receptacle 96 within which is secured as by rivets or the like 98 a resilient leaf spring member indicated generally by the number 100. This latter member includes an angulated end or finger grip portion 102, a central apertured portion 104 with an aperture 106 therein, a flat mounting base 108 engaging and secured to the member 96 by the rivet 98, and an angulated end portion 110.

The operation of this form of the invention will be readily apparent and it serves to secure the member 90 releasably to the supporting member 92.

FIGURES 10 and 11 show yet another specialized form of the resilient locking fastener of this invention. The fastener, indicated by the numeral 120 is shown employed to retain an irregular shaped or unusual dimensioned object 122 against a flat supporting member 124. The latter has an anchor pin 126 projecting therefrom upon which the fastener is secured releasably.

The fastener in this form of the invention consists of the usual single sheet of resilient sheet metal comprising a flat anchor portion 128 having an anchor pin aperture 130 therethrough and a finger grip portion 132 extending angularly from one side thereof. From the other side of the anchor portion 128 there is provided a downwardly extending flat flange-like member 136 having a cylindrical loop or bight portion 138 from which projects an elongated upward flange or plate 140 terminating at its upper end in a perpendicularly outwardly directed lip or flange 142.

As will be apparent from FIGURE 11, the elongated flange 140 is of sufficient size to enable the lip 142 to engage over an object 122 which is of greater height than that of the anchor pin 126. When the fastener is applied to the anchor pin with the lip 142 engaging over the object 122, a resilient pressure will be applied serving both to securely lock the fastener to the anchor pin and also to lock the fastener to the object 122 and the latter to the support surface 124. This arrangement will firmly hold the object despite possible vibration applied thereto, but the fastener can be readily released in the same manner as set forth in connection with the preceding embodiments.

In FIGURE 12 there is shown the principle of the invention applied in its simplest form. Here, a support surface 150 is provided with an upstanding anchor pin 152 and a fastener indicated generally by the numeral 154 is resiliently engaged on the anchor pin and bears against the support surface to clamp any flat member thereagainst. The fastener consists of a V-shaped body having an anchor portion 156 apertured to receive the anchor pin 152 and a clamping portion 160. The operation of this form of the invention is identical to that previously described and provides a very simple and inexpensive construction for quickly clamping a sheet-like element against the supporting surface.

In the embodiment of FIGURE 13, a similar type of fastener is provided. This likewise includes an anchor portion 170 apertured to receive an anchor pin 172 and provided with an angulated finger grip portion 174 and a generally cylindrical shaped clamping portion 176. This fastener is especially contoured to engage a cylindrical object such as an electric cable or the like 178 and clamp it to a flat supporting surface such as the surface 180. The operation of this form of the invention will be readily understood from the explanation given with regard to the preceding forms.

FIGURE 14 shows yet another fastener quite similar to that of FIGURE 13. Here again the fastener includes a sheet metal member having at one end a finger grip portion 190 integrally connected with an anchoring portion 192 apertured as at 194 to releasably receive the anchor pin 196 carried by a flat supporting surface 198. The anchoring portion 192 is provided with a downturned lip 200 adapted to partially embrace an article 202 such as the sheathing or housing of a pair of electrically conductive elements 204.

FIGURE 15 shows a quite similar construction to that of FIGURE 12 except that the supporting surface 210 is shown provided with a pair of anchor pins 212 while the fastener has its anchoring portion 214 provided with a pair of anchoring apertures therethrough to receive the anchoring pins and has a finger grip portion 216 at one side thereof and a clamping portion 218 at the other side. The clamping portion may be provided with an upturned lip 220 to thus provide a rounded projection or ridge 222 cooperating with the anchoring surface 210 to clamp some sheet-like element therebetween.

Figure 16:
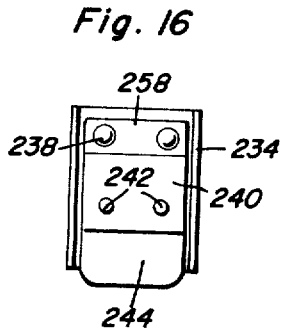
FIGURE 16 is an elevational view of yet another form of the invention.

Shown in FIGURES 16 and 17 is a still further modified structure quite similar to that of FIGURES 8 and 9. In this form, a flat supporting member 230 has a pair of anchor pins 232 projecting therefrom. A U-shaped member 234 which may comprise a mounting bracket, a housing or receptacle mounting flange or the like is adapted to enclose and conceal the anchor pins 232 when mounted thereon. The resilient locking fastener indicated generally by the numeral 236 consists of a leaf spring having one extremity anchored to the bight portion of the member 234 as by rivets 238 and having an angularly extending plane portion 240 provided with a pair of apertures 242 to receive the anchor pins 232. A finger grip portion 244 is angulated and extends from the anchor portion 240 thereof.

In each of the illustrated forms of the invention the resilient locking fastener consists of a single unitary sheet metal body having a generally central locking portion, an angulated finger grip portion and an angulated clamping portion. In each instance, a resilient deflection or deformation of the fastener serves both to apply resilient pressure to the object engaged by the fastener and also to resiliently lock the fastener to its anchor pin. The device is of simple construction, light weight, inexpensive, easily applied and easily released.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A resilient locking fastener comprising a unitary one-piece generally straight leaf spring having a central portion with a locking aperture for resilient, tiltable locking engagement of said fastener by said central portion upon an anchor pin, finger-grip and clamping portions projecting laterally from said central portion on opposite sides of said aperture, said fingergrip and clamping portions being angulated with respect to the plane of said central portion, said clamping portion being bifurcated and having parallel furcations with convex clamping surfaces, said furcations being sufficiently spaced and of sufficient length for embracing therebetween a shaft and with said clamping surfaces engaging and applying an axial thrust to a member slidably mounted upon said shaft.

2. A resilient locking fastener comprising a unitary one-piece generally straight leaf spring having a central portion with a locking aperture for resilient, tiltable locking engagement of said fastener by said central portion upon an anchor pin, fingergrip and clamping portions projecting laterally from said central portion on opposite sides of said aperture, said fingergrip and clamping portions being angulated with respect to the plane of said central portion, said clamping portion being bifurcated and having parallel furcations with convex clamping surfaces, the outer extremities of said furcations outwardly of said clamping surfaces being reversely angulated relative to said clamping portion and provide further finger grip elements.

3. A resilient locking fastener comprising a unitary one-piece generally straight leaf spring having a central portion with a locking aperture for resilient, tiltable locking engagement of said fastener by said central portion upon an anchor pin, fingergrip and clamping portions projecting laterally from said central portion on opposite sides of said aperture, said fingergrip and clamping portions being angulated with respect to the plane of said central portion, said clamping portion being bifurcated and having parallel furcations with convex clamping surfaces, said clamping portion having a plurality of longitudinally spaced sections which are successively reversely angulated, one of said angulated sections constituting a clamping member for retaining an article.

References Cited by the Examiner

UNITED STATES PATENTS

| | | | |
|---|---|---|---|
| 799,989 | 9/1905 | Klein. | |
| 845,665 | 2/1907 | Ramsden | 269—166 |
| 986,069 | 3/1911 | Kohlhaas. | |
| 2,295,685 | 9/1942 | Place | 85—36 |
| 2,298,981 | 10/1942 | Smith | 24—259 X |
| 2,415,540 | 2/1947 | Simmons | 85—36 |
| 2,674,150 | 4/1954 | Flora | 85—36 |
| 2,746,340 | 5/1956 | Sislik | 85—36 |
| 2,781,686 | 2/1957 | Boyd | 85—36 |
| 2,920,338 | 1/1960 | Falk | 16—66 |

FOREIGN PATENTS

| | | |
|---|---|---|
| 655,467 | 12/1928 | France. |
| 780,899 | 2/1935 | France. |
| 444,980 | 6/1927 | Germany. |

WILLIAM FELDMAN, *Primary Examiner.*

DONLEY J. STOCKING, *Examiner.*

E. SIMONSEN, *Assistant Examiner.*